March 29, 1938.  G. B. KAPLAN  2,112,812
SOAP DISPENSING APPARATUS
Filed Jan. 16, 1936  2 Sheets-Sheet 1
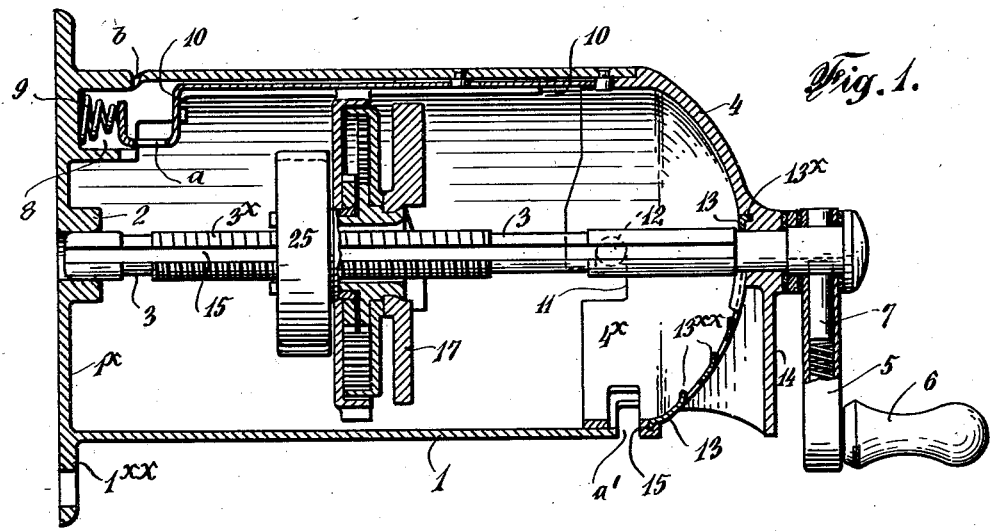
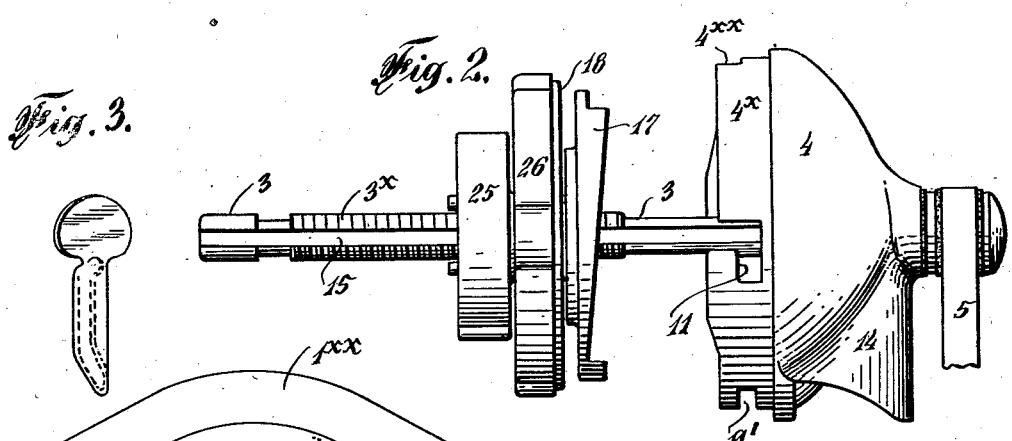
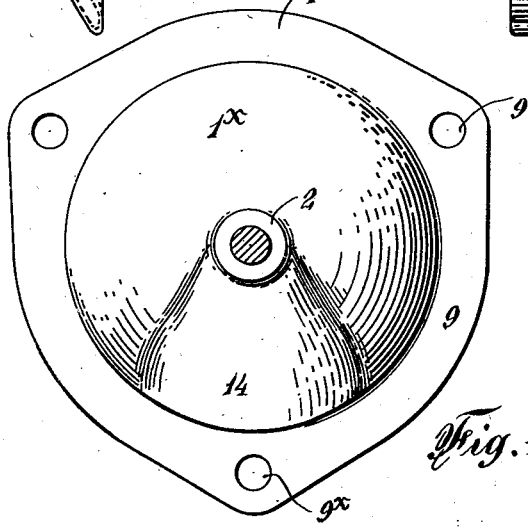
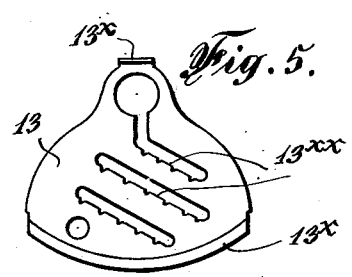
INVENTOR
George B Kaplan
BY H. Lee Helm
ATTORNEY March 29, 1938.   G. B. KAPLAN   2,112,812
SOAP DISPENSING APPARATUS
Filed Jan. 16, 1936    2 Sheets-Sheet 2
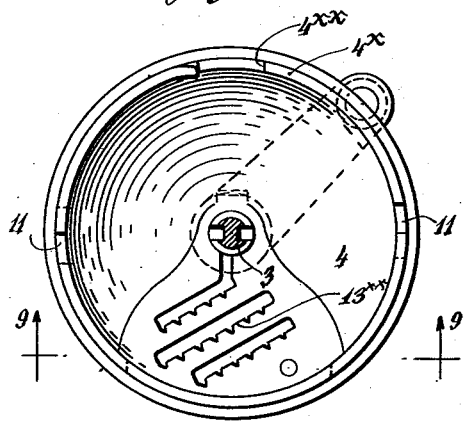
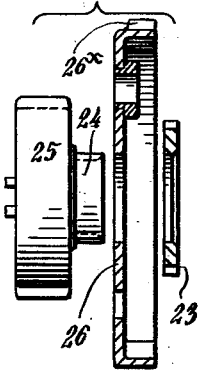
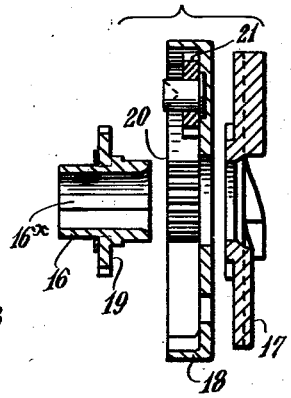
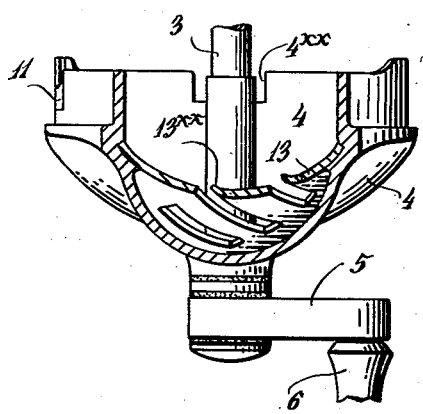
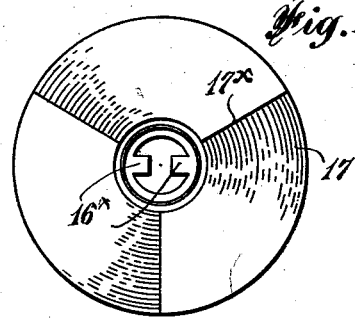
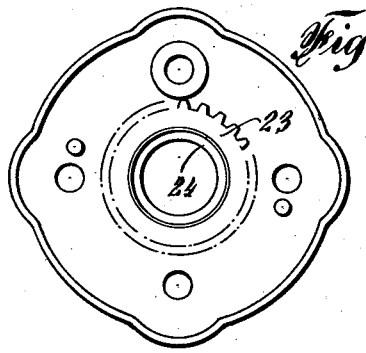
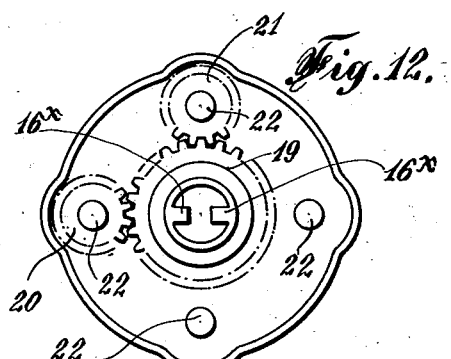
INVENTOR
George B. Kaplan
BY
ATTORNEY Patented Mar. 29, 1938

2,112,812

UNITED STATES PATENT OFFICE 2,112,812

SOAP DISPENSING APPARATUS

George B. Kaplan, New York, N. Y., assignor to Soapitor Company, Inc., New York, N. Y., a corporation of New York Application January 16, 1936, Serial No. 59,372

2 Claims. (Cl. 146—61)

This invention relates to a dispensing machine for a cake of soap, the latter being ground into fine powder by the operation of the machine.

The object of the invention is to provide a simple and effective machine of this character, particularly as to the form of the casing, the cutter, in the construction of the slow-speed propelling means for the cake of soap and other improvements in the construction of the Evans Patent No. 1,191,071.

Other objects of the invention will hereinafter appear.

The invention will be described with reference to the accompanying drawings, in which:

Figure 1 is a longitudinal section through an embodiment of the invention.

Figure 2 is a side elevation of the driving shaft, the casing cover, and certain connected elements.

Figure 3 is a view of the key.

Figure 4 is a rear elevation of the casing.

Figure 5 is an elevation of the cutter element, taken from the front face thereof.

Figure 6 is an inner view in elevation of the cover member.

Figure 7 is a sectional view of certain elements of the propelling means, separated and partly in section.

Figure 8 is a sectional view of certain propelling elements arranged for assembly with those of Figure 7.

Figure 9 is a longitudinal section on the line 9—9 of Fig. 6, looking in the direction of the arrows.

Figure 10 is a front elevation of the soap-engaging element of the propelling means.

Figure 11 is a view in elevation of one of the two gear casing members.

Figure 12 is a view similar to Figure 11, showing the second gear casing member.

In the drawings, and referring particularly to Figure 1, I have shown a cylindrical casing 1 having an integral rear wall 1x formed with a laterally extending flange 1xx, the rear wall being apertured and the aperture surrounded by a bearing member 2.

Mounted for rotation within bearing member 2 is a driving shaft 3, the opposite end of the shaft 3 being received in a bearing of cover member 4. The shaft projects forwardly of cover member 4 and has applied thereto a crank arm 5 carrying operating handle 6, the crank arm being hollow and receiving a spring pressed pawl 7 which may be formed with a tapered end to engage a similarly formed aperture (not shown) in the end of the shaft, so that when the arm is rotated in one direction it will move idly on the shaft, but when rotated in the opposite direction will impart rotation to the shaft. Formed integrally with the rear wall 1x of the casing is a cup 8 adapted to receive a spring 9 which engages the bent end of a locking bar 10. An aperture formed in the bar at a lies in register with an opening b in the casing wall so that when cam key 3 is inserted, bar 10 will be moved downwardly against the tension of the spring.

Cover member 4 is formed with a reduced annular inner rim 4x provided with bayonet slots at 11, each of which receives a stud such as stud 12, Figure 1. When the cover member is in place and rotated relatively to the studs 12, bar 10 will engage shoulder 4xx of member 4x and prevent rotation of the cap and hence will lock the same against removal.

In Figure 5 I have shown a cutter knife 13 formed with flanges at 13x. The cutter member is cast in with the metal of cover member 4 forming an integral wall section thereof, the flanges being imbedded into the metal as shown in Figure 1. The cutter member is slit at spaced points, the edge of each slit is sharpened and bent inward, preferably being serrated to form toothed cutters as indicated at 13xx, Figure 1. The cover member may be formed with a spout 14. The casing adjacent the cutter member 13 may be provided with an aperture as at a', Figures 1 and 2, in register with a similarly formed aperture of flange 4x, so that the ground soap may pass out of the device both rearwardly and forwardly of the cutter member.

Driving shaft 3 is designed to pass through an axial aperture formed in the cake of soap (not shown). The shaft is provided with one or more longitudinally extending slots 15. Engaging the slots, when two slots are employed, are opposed arms 16x of a hub 16 which has fixed thereto a follower 17 formed with shoulders 17x adapted to engage similarly formed shoulders at the end of the soap cake for rotation thereof. Sleeve 16 passes loosely through an axial aperture formed in a gear-retaining member 18, the gear-retaining member being held in position by means of a gear 19 fixed to the sleeve. Gear 19 is in mesh with four pinions, one being at 20, the remaining pinions being indicated at 21, rotatably mounted on stud shafts 22, the pinions 20 being thicker than the three pinions 21 and being in mesh with a gear wheel 23 fixed to the projecting hub 24 of the clutch member 25.

The clutch member 25 forms no part of the present invention and may be similar in construction to the equivalent member shown in the said Evans Patent No. 1,191,071, its function being to normally engage the threads 3x formed on shaft 3 during the propelling of the cake of soap toward cutter 13 but being releasable when desired so that upon the insertion of a fresh cake of soap the entire propelling mechanism can be moved rearwardly for new action.

Hub 24 of member 25 projects through an axial aperture formed in a casing member 26, and the periphery of gear-retaining member 18 is pressed into the flanged cup-like casing member 26 so that the two are in effect a single body.

In the action of the device, the gear-retaining member 18 and casing 26 are held against rotation, for example, member 26 may be provided with a lug 26x which will bear against locking bar 10, thus preventing rotation of members 18 and 26 with their enclosed gears, with the exception that gear 23 which is fixed to the hub of clutch member 25 will rotate with shaft 3 as the latter is turned by handle 6.

Gear 23 through its engagement with the thick pinion 20 will cause rotation of gear 19 which is fixed to a sleeve 16, the latter being keyed to shaft 3. If, therefore, the interconnected gears are of such ratio that gear 19 and the pinions 20, 21, hold back gear wheel 23 to a speed less than that of the shaft, there will be a relative movement between the shaft and clutch member 25 which is in mesh with the threads of the shaft. In the present construction, there is one less tooth in gear wheel 19 than in gear wheel 23. There will be, for example thirty-one teeth in gear wheel 19 and thirty-two teeth in gear wheel 23. Thus for each thirty-two rotations of shaft 3 there will be a forward movement of clutch member 25, and hence the interconnected member 17 and the cake of soap, say, a degree equivalent to the thickness of a thread on the shaft 3. Of course, this can be regulated by the gauge of the spiral thread formation on shaft 3 and the exact relationship of the gears.

In the operation of the device, the back of the casing may be set up against a vertical surface and screws may be passed through the holes at 9x to fasten the device to the surface, as, for example, a wall. By inserting the key shown in Figure 3 through keyhole B and pressing the same downward, cam action thereof will move the locking bar rearwardly until its front end passes out of engagement with shoulder 4xx of the cover member 4. The cover member may then be rotated so as to bring its bayonet slot or slots in such position as to clear the stud 12 and the cover member removed. It will be noted that the cover member will carry with it crank arm 5, shaft 3 and all of the movable operating parts of the device, with the exception of the locking bar. Clutch 25 may now be manipulated to cause its release from the threads of shaft 3 and with all of its attached parts including the follower 17, it may be removed from the shaft and a cake of soap placed upon the shaft. This is followed by return of the clutch and its connected parts to the shaft and release of the clutch for engagement with the threads of the shaft. The soap thus carried on the shaft forwardly of the clutch and its associated members will then be placed within casing 1 followed by rotation of the cover member 4 and withdrawal of the key so that the forward movement of locking bar will lock the cover member in place. The parts will then be in position for rotation of the shaft 3 by handle 6 and crank arm 5, thus causing rotation of the cake of soap and slow bodily movement thereof toward the cutter, this following until the entire cake is ground into powder the powder being adapted to fall from the cutter both forwardly and rearwardly thereof as explained above.

It will be seen that by the above construction, I am enabled to use the rear wall of the casing as a bearing member for the shaft, to employ the cutter member as an integral part of the cover member whilst making the cover member primarily of relatively soft alloy so as to be cast. I have also provided means by which the soap may be discharged both forwardly and rearwardly of the cutter. I have provided a simplified and more effective form of cover member. I have also greatly simplified and made more effective the follower and gear control elements.

Having described my invention, what I claim and desire to secure by Letters Patent, is as follows:—

1. A soap dispensing machine comprising an annular casing formed integrally at one end with a closure wall having a flange extending laterally of the casing and apertured to receive fastening devices, the wall also being formed centrally thereof with a thickened area apertured to form a cylindrical bearing for a shaft, a threaded shaft within said cylindrical bearing, means carried by the shaft for rotating a cake of soap and for positively feeding the soap in a direction reverse to that of said closure wall, a cover member for the end of the casing opposite said wall, means for latching the cover member to the casing, and a preformed cutter member cast with and forming a part of the wall of said cover member having opposed angularly extending marginal flanges imbedded in the said wall and one of said flanges extending in a line transversely of the line of pressure on the cutter member by the feeding of the soap, the cutter being formed with discharge openings for ground soap.

2. A soap dispensing machine comprising an annular casing formed integrally at one end with a flat cover wall adapted to receive fastening devices for attaching the casing to a vertical surface, the closure wall also being formed centrally thereof with an apertured inwardly projecting boss adapted as a bearing member for a shaft, a threaded shaft within said aperture, means carried by the shaft for rotating a cake of soap and for positively feeding the soap in a direction away from the closure wall, a cover member for the end of the casing opposite said wall, said cover member having a cut away area and being formed with a cylindrical area adapted to enter the casing, and with a relatively thick apertured bearing wall for a shaft, said wall having a depending integral hood forwardly of said cylindrical area, a preformed cutter member inserted within said cut away area of the cover member and having discharge openings for ground soap cooperating with discharge openings formed in said cylindrical area of the cover member and in the adjacent wall of the casing, opposed wall areas of said hood being integrally connected with the cover member adjacent opposed sides and top of said cut away area, thereby acting as an arch-strut reinforcement for said areas and the cutter member.

GEORGE B. KAPLAN.